US010101640B2

(12) United States Patent
Chen et al.

(10) Patent No.: US 10,101,640 B2
(45) Date of Patent: Oct. 16, 2018

(54) PROJECTION CONTROL

(71) Applicant: Lenovo (Beijing) Limited, Beijing (CN)

(72) Inventors: Jianyu Chen, Beijing (CN); Xiaohua Qiu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 15/457,668

(22) Filed: Mar. 13, 2017

(65) Prior Publication Data

US 2017/0261843 A1   Sep. 14, 2017

(30) Foreign Application Priority Data

Mar. 11, 2016 (CN) .......................... 2016 1 0139951

(51) Int. Cl.
*G03B 21/14* (2006.01)
*H04N 9/31* (2006.01)
(Continued)

(52) U.S. Cl.
CPC ......... *G03B 21/142* (2013.01); *G03B 21/145* (2013.01); *G03B 21/28* (2013.01);
(Continued)

(58) Field of Classification Search
CPC .... G03B 21/14; G03B 21/145; H04N 9/3129; H04N 9/3141; H04N 9/3185
See application file for complete search history.

(56) References Cited

U.S. PATENT DOCUMENTS 7,771,057 B2 * 8/2010 Combs ................. G03B 21/134
                                                          347/2
7,883,221 B2 * 2/2011 Nozaki .................. G03B 17/00
                                                          345/1.1
(Continued)

FOREIGN PATENT DOCUMENTS

CN      1670613 A    9/2005
CN    103941528 A    7/2014
(Continued)

OTHER PUBLICATIONS

"First Office Action for Application No. 201610139951.6" dated Apr. 19, 2017, 21 pages.

*Primary Examiner* — Sultan Chowdhury
(74) *Attorney, Agent, or Firm* — Kunzler, PC

(57) ABSTRACT

A connection structure connects to an electronic device and a projection component that connects to the electronic device through the connection structure to project a target projection content from the electronic device. The projection component includes a transmission module, an output interface, a direction change mechanism, and a linkage apparatus. The transmission module receives the target projection content. The output interface outputs an initial light ray of the target projection content. The direction change mechanism directs the initial light ray as an output light ray in one of a plurality of output directions. The linkage apparatus is coupled to the connection structure and the direction change mechanism to drive the direction change mechanism to change the output direction of the output light ray from a first output direction to a second output direction in response to a variation in a relative arrangement between the projection component and the electronic device.

11 Claims, 18 Drawing Sheets

(51) Int. Cl.
*H01R 39/64* (2006.01)
*G03B 21/28* (2006.01)

(52) U.S. Cl.
CPC ........... *H01R 39/64* (2013.01); *H04N 9/3173* (2013.01); *H04N 9/3185* (2013.01)

(56) References Cited

U.S. PATENT DOCUMENTS

| | | | | |
|---|---|---|---|---|
| 2012/0140188 A1* | 6/2012 | Yasuda | ................ | H04N 9/3161 |
| | | | | 353/69 |
| 2012/0206697 A1* | 8/2012 | Lee | ......................... | G03B 21/14 |
| | | | | 353/82 |
| 2015/0022785 A1* | 1/2015 | Kinebuchi | ............. | F16M 11/00 |
| | | | | 353/52 |
| 2015/0160912 A1* | 6/2015 | Zhang | ................... | G06F 3/1454 |
| | | | | 345/1.1 |

FOREIGN PATENT DOCUMENTS

| | | |
|---|---|---|
| CN | 104035742 A | 9/2014 |
| CN | 104346118 A | 2/2015 |
| CN | 104423419 A | 3/2015 |
| CN | 104423542 A | 3/2015 |
| CN | 104735250 A | 6/2015 |

* cited by examiner

PROJECTION CONTROL

FIELD

The present disclosure relates to the field of mechanical design technology, particularly to a projection control for an electronic device.

BACKGROUND

With the development of electronic technologies, various functional components, such as projection systems, on terminal devices, such as cell phones, become more and more available.

However, during projection of display elements on existing terminal devices, operations of screen rotation or alignment for terminal structures have to be adjusted. Changes in projection modes and other display states have to be adjusted in order to realize simultaneous changes of terminal states and projection modes, so that operation complexity increases.

SUMMARY

Embodiments of a device are described. In some embodiments, the device includes a connection structure that connects to an electronic device and a projection component that connects to the electronic device through the connection structure to project a target projection content received from the electronic device. The projection component includes a transmission module, an output interface, a direction change mechanism, and a linkage apparatus. The transmission module receives the target projection content from the electronic device. The output interface outputs an initial light ray corresponding to the target projection content. The direction change mechanism directs the initial light ray to form an output light ray in one of a plurality of output directions. The linkage apparatus is coupled to the connection structure and the direction change mechanism. The linkage apparatus drives the direction change mechanism to change the output direction of the output light ray from a first output direction to a second output direction in response to a variation in a relative arrangement between the projection component and the electronic device.

Embodiments of a system are also described. In some embodiments, the system includes an electronic device, and a projection device. The electronic device has a target projection content. The projection device includes a projection component and a connection structure. The projection component receives the target projection content from the electronic device. The connection structure connects the projection component to the electronic device. The projection component includes a transmission module, an output interface, a direction change mechanism, and a linkage apparatus. The transmission module receives the target projection content from the electronic device. The output interface outputs an initial light ray corresponding to the target projection content. The direction change mechanism directs the initial light ray to form an output light ray in one of plurality of output directions. The linkage apparatus is coupled to the connection structure and the direction change mechanism. The linkage apparatus drives the direction change mechanism to change the output direction of the output light ray in response to a variation in an arrangement of the projection component relative to the electronic device.

Embodiments of a method are also described. In some embodiments, the method includes sending a target projection content from an electronic device to a projection device for projection display. The method also includes detecting a variation in an arrangement of the electronic device relative to the projection device. The method also includes adjusting an output direction of the target projection content in response to the variation of an arrangement of the electronic device relative to the projection device.

BRIEF DESCRIPTION OF THE DRAWINGS

The foregoing and other objects, features and advantages of the present disclosure will become more apparent from the detailed descriptions of the embodiments of the present disclosure in conjunction with the drawings. The drawings are used to provide a further understanding of the embodiments of the present disclosure and constitute a part of the Description, which, together with the embodiments of the present disclosure, serve to explain the present disclosure and are not to be construed as a limitation to the present disclosure. Unless explicitly indicated, the drawings should not be understood as being drawn to scale. In the drawings, the same reference numerals generally represent the same components or steps. In the drawings.

DETAILED DESCRIPTION

The technical solution in the embodiments of the present disclosure is described clearly and completely as follows with reference to the accompanying drawings in the embodiments of the present disclosure. Obviously, the embodiments described are not all, but rather only some of the embodiments of the present disclosure. Based on the embodiments of the present disclosure, all other embodiments derived by persons of ordinary skill in the art without any creative efforts shall fall within the protection scope of the present disclosure.

Figure 1:
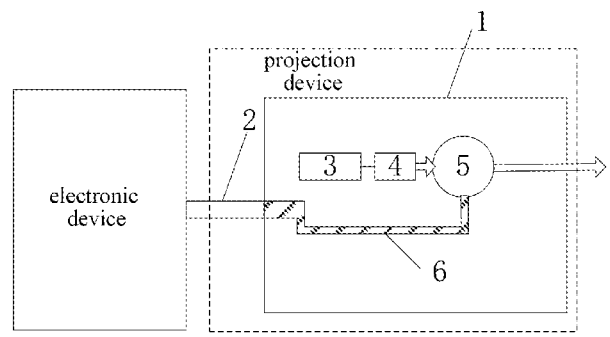
FIG. 1 is a schematic structural diagram of a projection device provided in one embodiment of the present invention.

Referring to FIG. 1, a schematic structural view of a projection device is provided in one embodiment of the present disclosure, wherein the projection device may comprise a projection component 1 and a connection structure 2. The projection component 1 can be fastened onto an electronic device through the connection structure 2 in a relatively movable manner. The electronic device may send a target projection content to the projection component 1 through a communication module thereof, and thus, the projection component 1 may output the target projection content. That is, the projection device in the embodiment can perform operations independent of the electronic device. The electronic device may include any electronic device, such as computer, phone, tablet, and the like.

A structural state or configuration of the connection structure 2 can characterize a location state of the projection component 1 relative to the electronic device. That is, the structural state or arrangement of the connection structure 2 can indicate a relative location state between the projection component 1 and the electronic device.

Specifically, in some embodiments, the projection component 1 includes a transmission module 3. In some embodiments, the transmission module receives the target projection content from the electronic device. The transmission module 3 may be a wired communication module or a wireless communication module, such as WiFi, Bluetooth, or GPS communication module, and the like. In some embodiments, the projection component 1 creates a communication connection with the electronic device through the transmission module 3. In some embodiments, the projection component 1 receives the target projection content sent by the electronic device through the transmission module 3. In some embodiments, the electronic device is a cell phone, tablet, notebook, and the like. In some embodiments, the target projection content may be image, text, or video content sent from the electronic device.

It is to be noted that the electronic device may include a communication module in communication with the transmission module 3 to create a communication connection to realize an effective transmission for the target projection content.

In the illustrated embodiment, the projection component 1 also includes an output interface 4 for outputting an initial light ray corresponding to the target projection content. In some embodiments, the initial light ray output by the output interface 4 is a light ray obtained by performing a digital to analog conversion on the target projection content.

In the illustrated embodiment, the projection component 1 also includes a direction change mechanism 5 for performing an optical path control for the initial light ray to form an output light ray which corresponds to a first projection mode or a second projection mode, an output direction of the output light ray differing between the first projection mode and the second projection mode.

In some embodiments, the projection component 1 utilizes the direction change mechanism 5 to be capable of two projection modes: the first projection mode and the second projection mode, in both of which the output direction of the output light ray output by the projection component differs from a first output direction to a second output direction.

In some embodiments, the projection component 1 also includes a linkage apparatus 6 coupled to the connection structure 2 and the direction change mechanism 5. In some embodiments, the linkage apparatus 6 drives the direction change mechanism 5 to change the output direction of the output light ray for the projection mode of the projection component 1 to be switched between the first projection mode and the second projection mode in response a variation in the location state of the projection component 1 relative to the electronic device.

In some embodiments, the linkage apparatus 6 and the connection structure 2 are connected. In some embodiments, the linkage apparatus 6 can monitor variation of the relative location state between the projection component 1 and the electronic device. In some embodiments, the monitoring of the variation occurs in real time in response to a variation in the structural state of the connection structure. In some embodiments, the linkage apparatus 6 drives the direction change mechanism 5 to change the output direction of the output light ray such that switching between the first projection mode and the second projection mode is realized.

In some embodiments, the projection component 1 has one linkage apparatus 6 connected to the connection structure 2, such that variation of the relative location state between the projection component 1 and the electronic device drives the mechanism 5 to change the output direction of the output light ray. In turn, a mode switching between the first projection mode and the second projection mode is realized without manual mode switching or instruction based mode switching performed for the projection device.

Figure 2A:
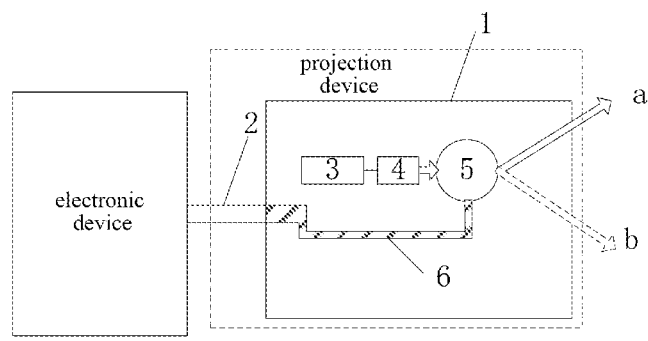
FIGS. 2a, 2b, 3a to 3g, 4, 5a, 5b, 6, 7a to 7e, 8a to 8f, 9a to 9e, 10a to 10c are schematic structural views according to various embodiments of the present invention, respectively.

In FIG. 2A, a first output direction "a" of the output light ray in the first projection mode is different from a second output direction "b" of an input light ray in the second projection mode. In the illustrated embodiment, the first output direction "a" is at a first angle while the second output direction "b" is at a second angle. In the illustrated embodiment, the first output direction "a" and the second output direction "b" have associated orientations. However, in other embodiments, the first output direction "a" and the second output direction "b" have other associated orientations. In some embodiments, the direction change mechanism 5 directs the output light ray in a range of directions. In other embodiments, the direction change mechanism 5 directs the output light ray in one of a plurality of set directions. Other embodiments include other capabilities of the direction change mechanism 5.

Figure 2B:
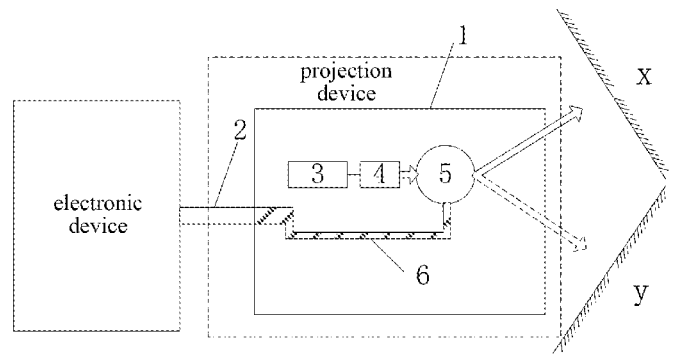

In FIG. 2B, the illustrated embodiment includes a first projection plane "x," to which the output light ray points in the first projection mode. The illustrated embodiment also includes a second projection plane "y," which is different from a projection plane "x," to which the output light ray points in the second projection mode.

In some embodiments, the linkage apparatus 6 comprises a Hall switch. Other embodiments include other mechanisms which may also be utilized to monitor the variation of the relative location state between the projection component 1 and the electronic device. In some embodiments, the connection structure 2 includes a Hall switch. In other embodiments, a Hall switch is disposed between the projection component 1 and the electronic device. In further embodiments, a detection module, such as a Hall device and the like, is disposed on the projection component 1 and the electronic device, respectively, to detect a relative motion between the projection component 1 and the electronic device.

In some embodiments, in response to output parameters of two detection modules, such as respective location messages of the two detection modules, are received, a variation of a relative location between the two detection modules is determined based on these output parameters. In some embodiments, in response to a detection of a variation of the relative location state between the projection component 1 and the electronic device, the linkage apparatus 6 drives the direction change mechanism to change the output direction of the output light ray for switching between the first projection mode and the second projection mode.

Figure 3A:
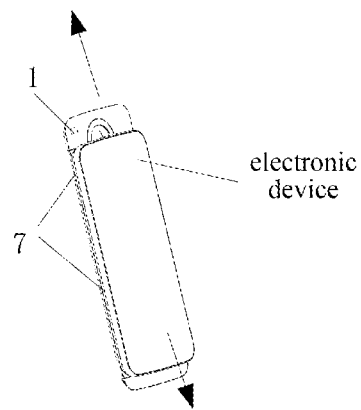
Figure 3B:
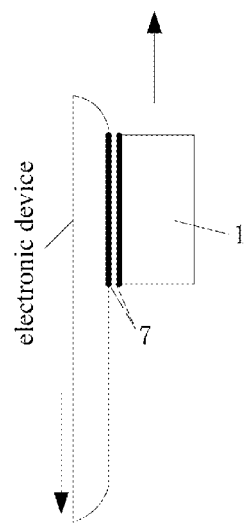

In the illustrated embodiment of FIG. 3A, the connection structure 2, between the projection component 1 and the electronic device, includes a sliding connection structure. In some embodiments, is the sliding connection structure includes a slideway 7 between the projection component 1 and the electronic device. In some embodiments, the projection component 1 and the electronic device are connected by the slideway 7. In some embodiments, the projection component 1 can perform a slide relative to the electronic device by the slideway 7, as shown in FIGS. 3a and 3b. Thus, a change of structural state of the slideway 7 characterizes existence of the relative slide between the projection component 1 and the electronic device.

Figure 3C:
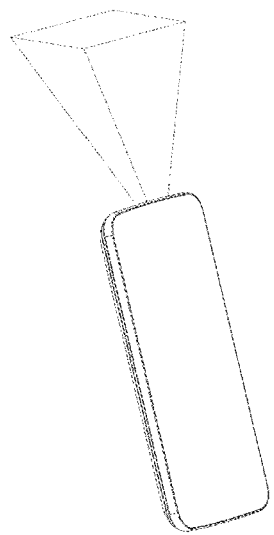
Figure 3D:
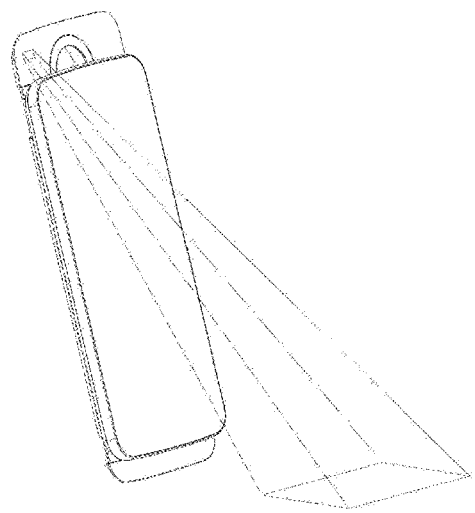

In some embodiments, when the relative slide exists between the projection component 1 and the electronic device, the linkage apparatus 6 drives the direction change mechanism 5 to change the output direction of the output light ray for the projection mode of the projection component 1. This change by the direction change mechanism 5 switches between the first projection mode and the second projection mode. For example, the first projection mode in FIG. 3c is switched to the second projection mode in FIG. 3d.

Figure 3E:
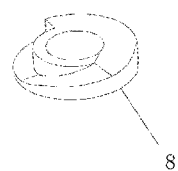
Figure 3F:
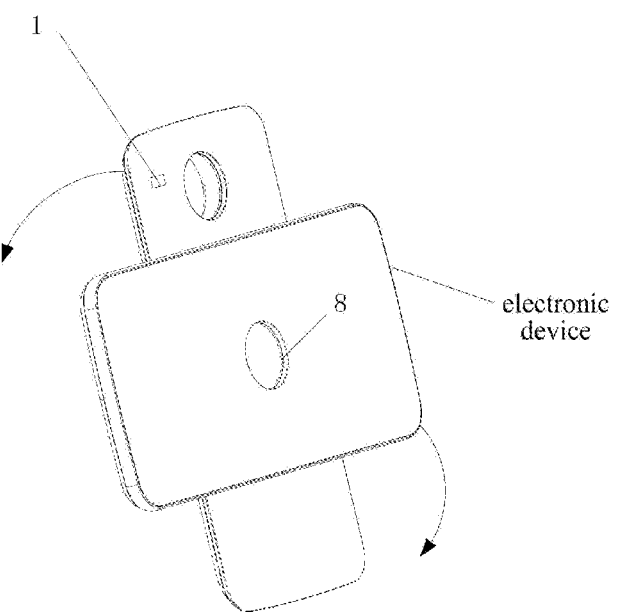
Figure 3G:
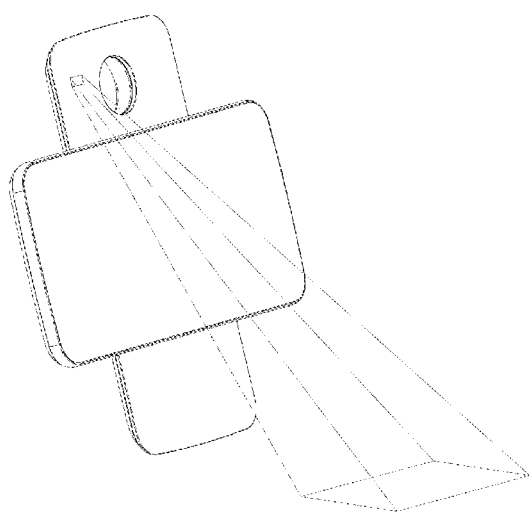

In other embodiments, the connection structure 2 between the projection component 1 and the electronic device is a rotary connection structure. In some embodiments, the rotary connection structure includes a cam structure 8, through which the projection component 1 and the electronic device are connected. In some embodiments, the projection component 1 can move relative to the electronic device through the cam structure 8, as shown in FIGS. 3e and 3f. In some embodiments, a change of a structural state of the cam structure 8 characterizes whether the relative rotation between the projection component 1 and the electronic device exists. In some embodiments, in response to the relative rotation between the projection component 1 and the electronic device exists, the linkage apparatus 6 drives the direction change mechanism 5 to change the output direction of the output light ray such that the projection mode of the projection component 1 is switched between the first projection mode and the second projection mode. For example, the first projection mode in FIG. 3c is switched to the second projection mode in FIG. 3g.

Figure 4:
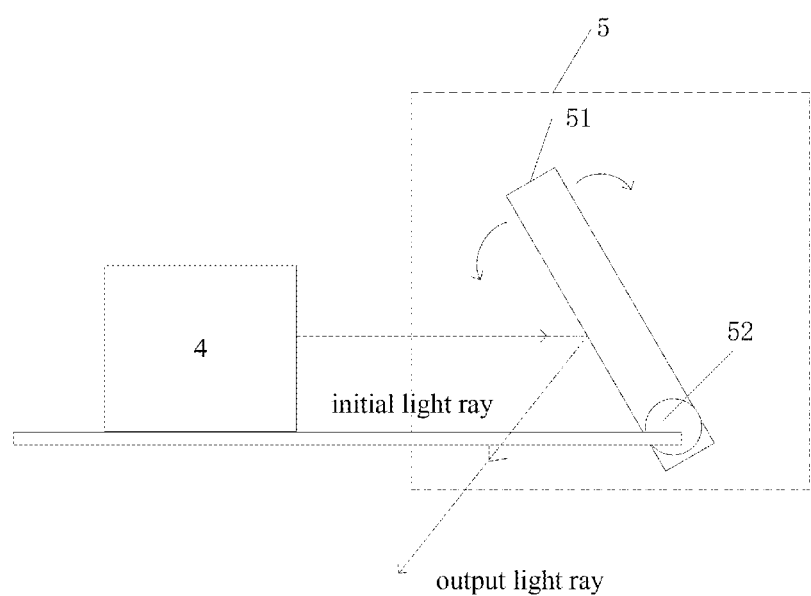

In the illustrated embodiment of FIG. 4, the direction change mechanism 5 includes a light reflection structure 51 for reflecting the initial light ray output by the output interface 4. The illustrated embodiment of FIG. 4 also includes a turning structure 52 coupled to the light reflection structure 51. In some embodiments, the turning structure 52 rotates the light reflection structure 51 to adjust an angle between the light reflection structure 51 and the direction of the initial light ray such that the output light ray through the direction change mechanism 5 corresponds to the first projection mode or the second projection mode. In some embodiments, the light reflection structure 51 is a reflective material such as a glass or metal. In other embodiments, the light reflection structure 51 is coated with a reflective material.

Figure 5A:
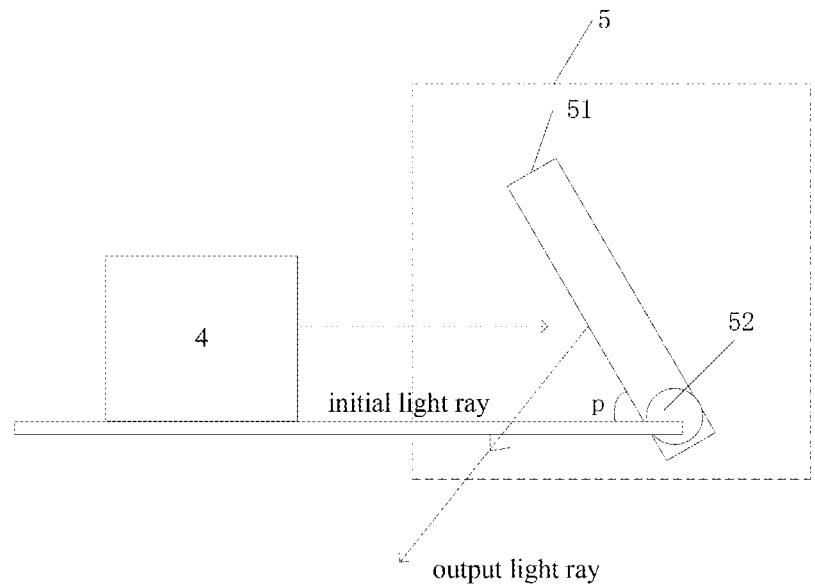

As shown in FIG. 5a, when the light reflection structure 51 and the direction of the initial light ray form a first angle p (acute angle), the output light ray of the direction change mechanism 5 corresponds to the first projection mode in which the light is directed in a first output direction. In the illustrated embodiment shown in FIG. 5b, when the light reflection structure 51 and the direction of the initial light ray form a second angle q (obtuse angle), the output light ray of the direction change mechanism 5 corresponds to the second projection mode in which the light is directed in a second output direction.

Figure 5B:
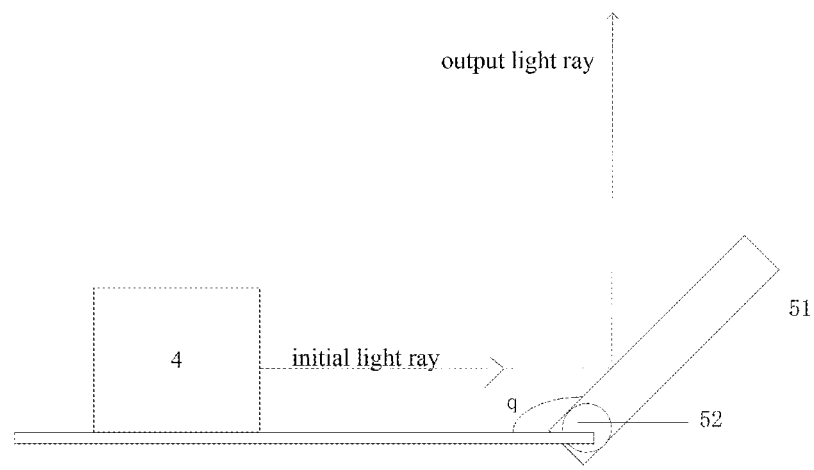

In the illustrated embodiment of FIG. 5B, the turning structure 52 is driven by the linkage apparatus 6 (of FIG. 1) to perform back and forth turning of the light reflection structure 51. In some embodiments, the turning structure 52 actuates the light reflection structure 51 to rotate back and forth for adjusting an angle between the light reflection structure 51 and the direction of the initial light ray. In some embodiments, adjustment of the light reflection structure 51 adjusts the output light ray through the direction change mechanism 5 to correspond to the first projection mode or the second projection mode.

In some embodiments, the turning structure 52 includes a rotating shaft and an elastic part, such as a torsion spring, which is coaxial with the light reflection structure 51, and can pull or push the rotating shaft to perform a turning motion.

Figure 6:
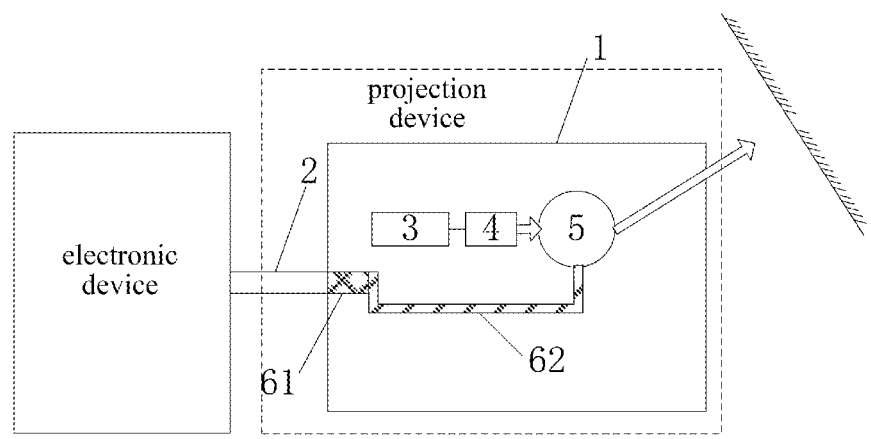

In the illustrated embodiment shown in FIG. 6, the linkage apparatus 6 (of FIG. 1) includes one or more structures to realize a corresponding driving function. In some embodiments, the linkage apparatus 6 includes a connecting element 61 and a driving element 62.

In some embodiments, the connecting element 61 couples to the connection structure 2. In some embodiments, a structural state of the connection structure 2 allows the connecting element 61 to have a first connection state or a second connection state. In some embodiments, when the location of the projection component 1 relative to the electronic device varies, a connection state of the connecting element 61 will be actuated to vary, i.e., the connecting element 61 is actuated to be in a first connection state or a second connection state.

In some embodiments, the connecting element 61 and the connection structure 2 are integrated in the same structure to save space for device implementation accordingly. In other embodiments, the connecting element 61 and the connection structure 2 are separate elements.

In some embodiments, the driving element 62 couples to the connecting element 61 and the direction change mechanism 5 for driving the direction change mechanism 5 to change the output direction of the output light ray when the connection state of the connecting element 61 varies. In some embodiments, when the location state of the projection component 1 relative to the electronic device varies, the structural state of the connection structure 2 varies, such that the connection state of the connecting element 61 varies, and in turn, the driving element 62 drives the direction change mechanism 5 to change the output direction of the output light ray.

In some embodiments, the driving element 62 directs or delivers the connection state of the connecting element 61 to the turning structure 52 of the direction change mechanism 5 such that the turning structure 52 rotates the light reflection structure 51 to cause a change in the structural state of the connection structure 2 and the rotation of the light reflection structure 51.

In some embodiments, the connecting element 61 includes a spring. In some embodiments, the spring is coupled to the connection structure 2. The spring may have a change with respect to an extension state due to the change of the structural state of the connection structure 2. Moreover, the change of the extension state of the spring results in a back and forth motion of the driving element 62. In some embodiments, the back and forth motion of the driving element 62 drives the turning structure 52 connected therewith to perform the turning motion, such that the turning structure 52 can actuate the light reflection structure 51 to perform rotation. In some embodiments, the rotation of the light reflection structure 51 results in a change of the output direction of the output light ray and the switching of the projection modes is accomplished.

In some embodiments, the connecting element 61 also includes a connecting rod mechanism 10. In some embodiments, the connecting rod structure 10 is connected to the connection structure 2. The connecting rod structure 10 can have a change of a linkage state due to the change of the structural state of the connection structure 2. In some embodiments, the change of the linkage state of the connecting rod structure 10 results in a back and forth motion of the driving element 62. In some embodiments, the back and forth motion of the driving element 62 drives the turning structure 52 to perform the turning motion. The turning structure 52 may actuate the light reflection structure 51 to perform rotation, so that the change of the output direction of the output light ray is realized, and the switching of the projection modes is accomplished.

Figure 7A:
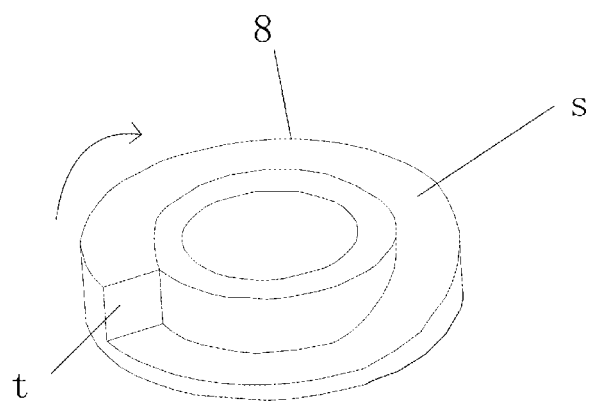

In the illustrated embodiment shown in FIG. 7*a*, the connection structure 2 includes a cam structure 8, having a top which includes a step structure. In the illustrated embodiment, the cam structure 8 includes an upright surface "t" and a beveled rotational surface "s". In some embodiments, the upright surface "t" is approximately orthogonal to the beveled rotational surface "s" where the two surfaces meet.

Figure 7B:
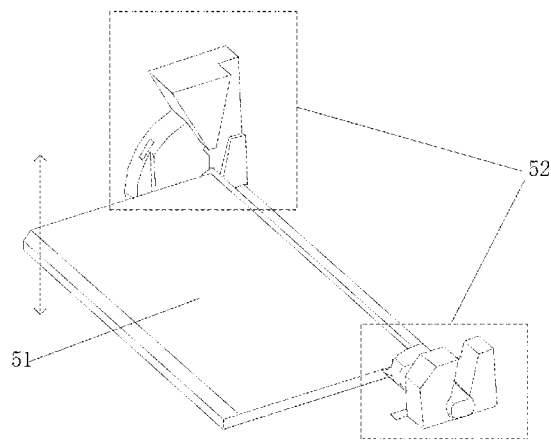

In the illustrated embodiment shown in FIG. 7B, the direction change mechanism 5 includes a light reflection structure 51 and a turning structure 52. In some embodiments, the turning structure 52 includes a torsion spring and a rotating shaft. The torsion spring and the light reflection structure 51 may be disposed coaxially. In some embodiments, the torsion spring can rotate the rotating shaft such that a free end of the light reflection structure 51 is allowed to perform a back and forth rotation simultaneously. For example, without application of external force, the torsion spring may actuate the rotating shaft and, in turn, actuate the free end of the light reflection structure 51 to perform rotation in a down to up direction as shown in FIG. 7B. In some embodiments, one end of the driving element 62 is coupled with the light reflection structure 51.

Figure 7C:
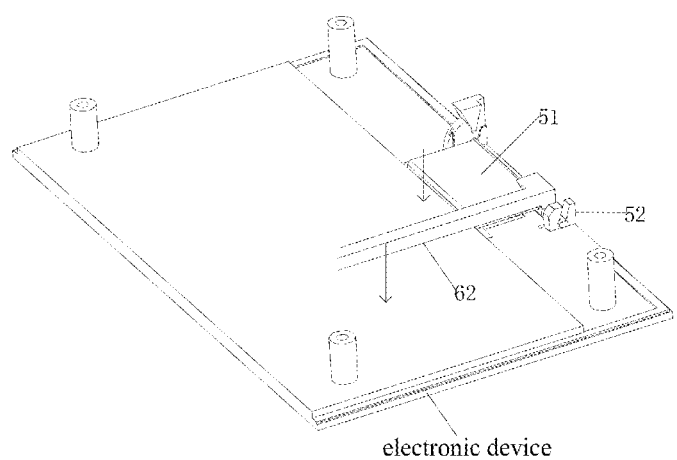

In some embodiments, the turning structure 52 applies an external downward force to the light reflection structure 51, such that the light reflection mechanism 51 is put into close proximity with the electronic device, as shown in FIG. 7*c*. In some embodiments, the connecting element 61 is implemented with the connecting rod mechanism 10. In some embodiments, one end of the connecting element 61 is connected to the driving element 62 and the another end is in contact with the rotational surface of the cam structure 8.

Figure 7D:
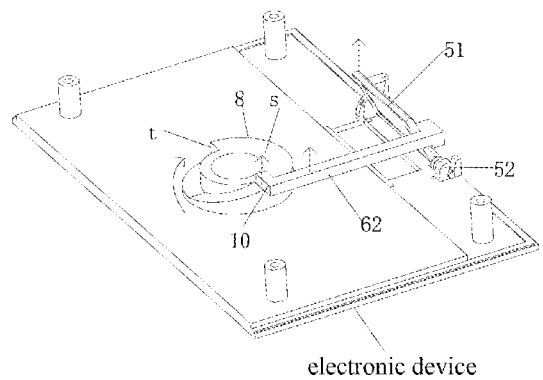

In some embodiments, when the cam structure 8 is rotated clockwise, as shown in FIG. 7*a*, i.e., when the electronic device and the projection component are rotated relatively, an upward pushing force from the rotational surface "s" of the cam structure 8 as shown in FIG. 7*d* is applied to the connecting rod mechanism 10, such that the connecting rod mechanism 10 is moved in a direction away from the electronic device, and in turn, actuates the driving element 62 to move in an upward direction as shown in FIG. 7*d*.

Figure 7E:
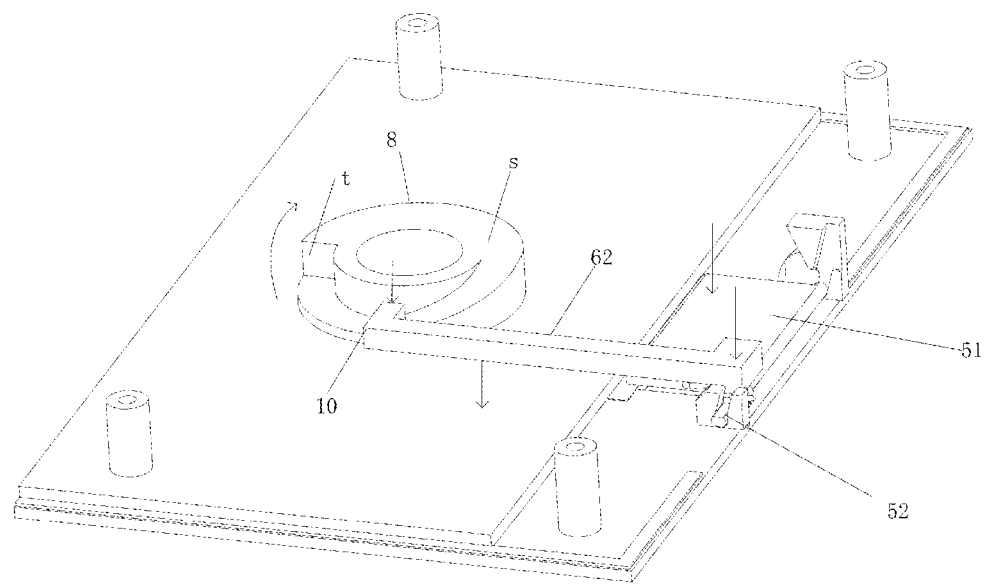

Thus, one end of the driving element 62 in connection with the turning structure 52 will remove a downward acting force applied to the turning structure 52, such that the torsion spring in the turning structure 52 actuates the rotating shaft to move in an upward direction as shown in FIG. 7*d*, so that the light reflection structure 51 is actuated to rotate by a corresponding angle upwards. In some embodiments, when the electronic device and the projection component 1 are rotated relatively again to go back to an original location, the cam structure 8 is rotated in correspondingly, such that the connecting rod mechanism 10 is lowered to a lowest location from the upright surface "t", as shown in FIG. 7*e*, so that the driving element 62 is actuated to move to a lowest location.

Thus, one end of the driving element 62 coupled with the turning structure 52 will apply an external downward force to the turning structure 52, such that the turning structure 52 actuates the light reflection structure 51 to rotate downwards and go back to an original location. The output direction of the output light ray is changed again, and accordingly, switching between the projection modes is realized.

For example, in some embodiments, the electronic device is a cell phone. In some embodiments, the projection component 1 is disposed on the back surface of the cell phone, i.e., a surface opposite to the surface where a screen is located, and the cell phone is in fastened connection with the cam structure 8. When the cell phone is rotated relative to the projection component 1, the cell phone actuates the cam structure 8 to rotate. With an implementation structure in the embodiment, an angular deflection for rotation between the cell phone and the projection component 1 is translated to a back and forth motion of a connection rod (e.g., the driving element in the example) and guided onto a turning mechanism of a mirror (light reflection structure) by utilizing a wedge-shaped mechanism (e.g., the cam structure in FIG. 7*a*) to realize an association between the two motions.

In other embodiments, the electronic device is a cell phone with a rotary screen or a rotary cover. The projection component 1 may be disposed on the rotary screen of the cell phone. When the cell phone performs a rotation, in the illustrated embodiment, an angular deflection for rotation between the rotary screen and a body portion of the cell phone is translated to a back and forth motion of a connection rod (e.g., the driving element in the example) and guided onto a turning mechanism of a mirror (light reflection structure) by utilizing a wedge-shaped mechanism (e.g., the cam structure in FIG. 7*a*) to realize an association between the two motions.

Figure 8A:
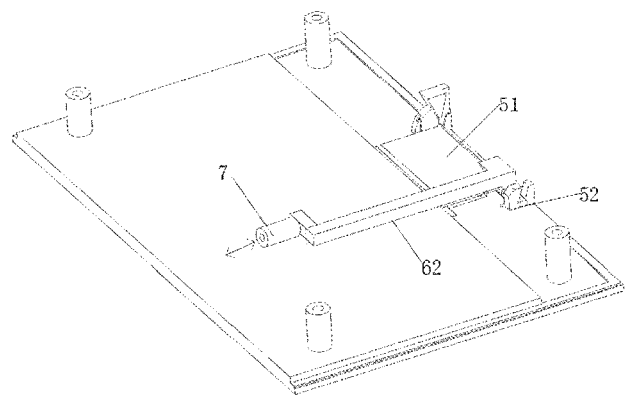

In the illustrated embodiment of FIG. 8*a*, the connection structure 2 is a slideway 7. The rail portion of the slideway 7 and the electronic device are in a fastened connection. The slider portion of the slideway 7 is in a fastened connection with the projection component 1. The slider portion slides within the rail portion, such as a left and right slide as shown in the embodiment of FIG. 8*a*. In some embodiments, the electronic device and the projection component performs a relative left and right or an up and down slide. In some embodiments, the direction change mechanism 5 includes a light reflection structure 51 and a turning structure 52. In some embodiments, the turning structure 52 is implemented by a torsion spring and a rotating shaft.

Figure 8B:
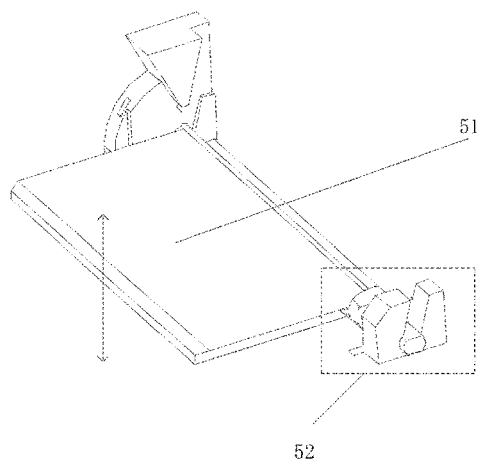
Figure 8C:
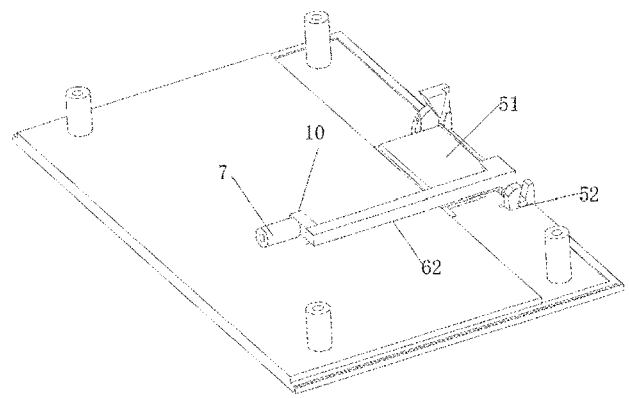

In some embodiments, the torsion spring and the light reflection structure 51 are disposed coaxially. Thus, the torsion spring can rotate the rotating shaft to cause a free end of the light reflection structure 51 to perform a back and forth rotation. For example, without application of external force, the torsion spring may actuate the rotating shaft, and in turn actuate the free end of the light reflection structure 51 to perform rotation in a down to up direction as shown in FIG. 8*b*, but in some embodiments, one end of the driving element 62 in connection with the turning structure 52 will apply an external downward force to the turning structure 52, such that the light reflection mechanism 51 is placed in close proximity with the electronic device, as shown in FIG. 8*c*. Moreover, in some embodiments, the connecting element 61 is implemented as a spring or a connecting rod structure 10.

Figure 8D:
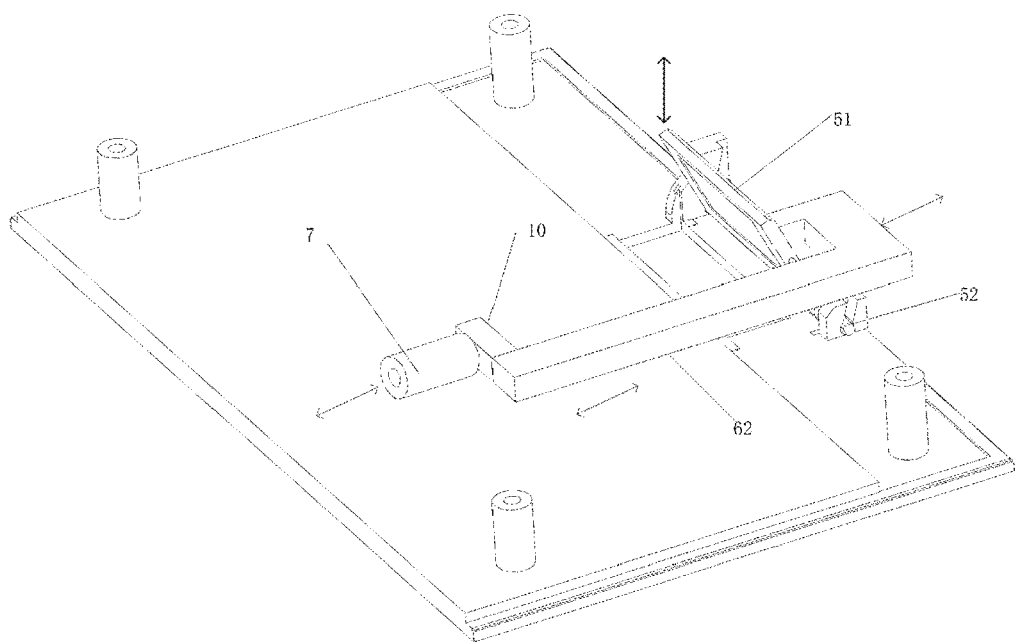

In some embodiments, one end of the connecting rod mechanism 10 is connected to a driving element 62 and the other end is connected to a slider. Thus, when the slider slides within a rail in a left and right direction as shown in FIG. 8*d*, (i.e., when the electronic device and the projection component perform a relative slide,) a leftward pulling force or a rightward pushing force is applied to the connecting rod mechanism 10, which accordingly, actuates the driving element 62 to move in a left-to-right or a right-to-left direction as shown in FIG. 8d.

Figure 8E:
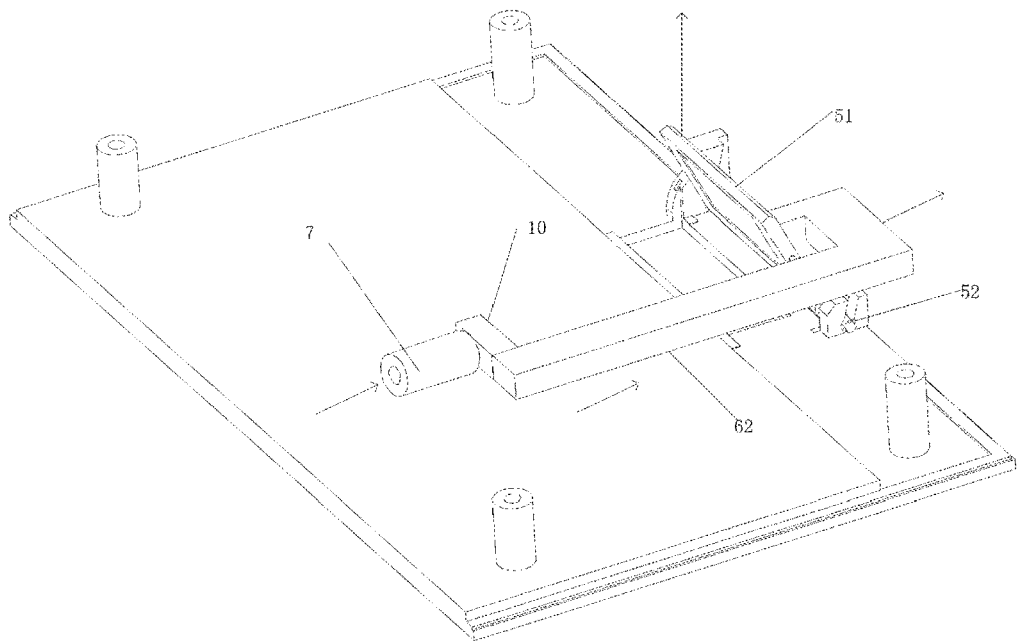

In some embodiments, when the slider moves rightwards as shown in FIG. 8e, a rightward pushing force as shown in FIG. 8e is received by the connecting rod mechanism 10, which, in turn, pushes the driving element 62 to move in a left-to-right direction as shown in FIG. 8e, such that the driving element 62 moves rightwards, followed by an upward movement of the turning structure 52. In some embodiments, a torsion spring in the turning structure 52 rotates a rotating shaft to move in a down to up direction as shown in FIG. 8e, such that the light reflection structure 51 is actuated to rotate upwards by a corresponding angle.

Figure 8F:
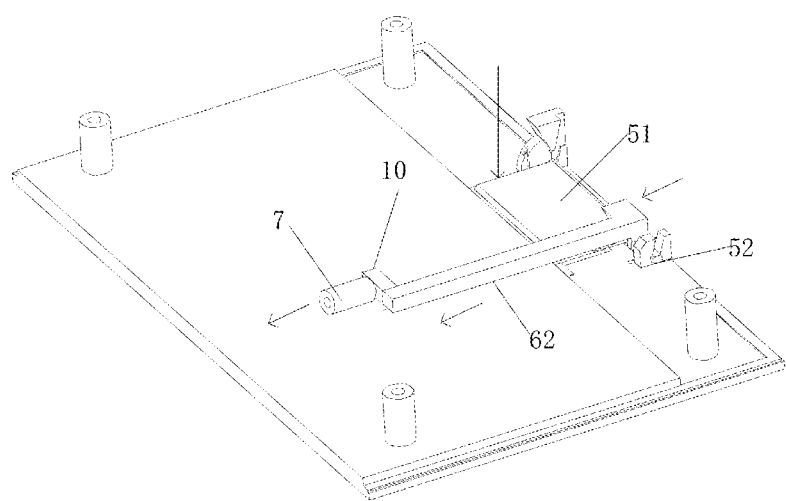

In some embodiments, when the electronic device and the projection component 1 go back to an original location again, relative to the slider, the connecting rod mechanism 10 moves in a right to left direction as shown in FIG. 8f due to pulling of the slider. In turn, the driving element 62 moves in a right to left direction as shown in FIG. 8f, so that the driving element 62 moves leftwards and applies a downward pressure to the turning structure 52 again, such that the turning structure 52 actuates the light reflection structure 51 to move downwards, and go back to an original location. The output direction of the output light ray is changed again, and accordingly, switching between the projection modes is realized.

For example, in some embodiments, the electronic device is a cell phone, the projection component 1 is disposed on the back surface of the cell phone, (i.e., a surface opposite to the surface where a screen is located,) a rail portion of the slideway 7 is in a fastened connection with the cell phone, and a slider portion of the slideway 7 is in a fastened connection with the projection component 1. In some embodiments, a movement distance of slide between the cell phone and the projection component 1 is translated to a back and forth motion of the connection rod (e.g., the driving element in the embodiment) and guided to a turning mechanism of a mirror (light reflection structure) by utilizing a connecting rod mechanism (e.g., the connecting rod structure in the above example) to realize an association between the two motions.

In another embodiment, the electronic device is a cell phone with a slide cover or a slide screen. The projection component 1 is disposed on the slide cover of the cell phone. When the slide cover of the cell phone slides, a movement distance between the slide cover and a body portion of the cell phone is translated to a back and forth motion of a connection rod (e.g., the driving element in the example) and guided onto a turning mechanism of a mirror (light reflection structure) by utilizing a connecting rod mechanism (e.g., the connecting rod structure in the above example) to realize an association between the two motions.

Figure 9A:
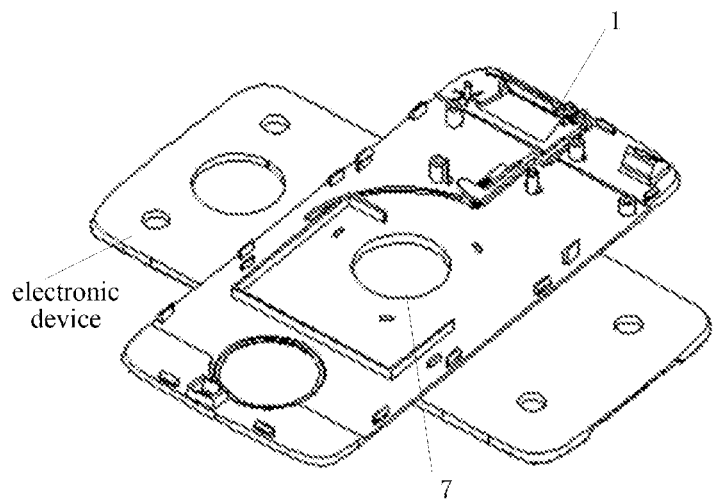

In the illustrated embodiment of FIG. 9a, the connection structure 2 is a slideway 7. The rail portion of the slideway 7 and the electronic device are in a fastened connection. The slider portion of the slideway 7 is in a fastened connection with the projection component 1, such that the electronic device and the projection component 1 perform a relative rotation. The direction change mechanism 5 includes a light reflection structure 51 and a turning structure 52. The turning structure 52 is implemented by a torsion spring and a rotating shaft. The torsion spring and the light reflection structure 51 are disposed coaxially.

Figure 9B:
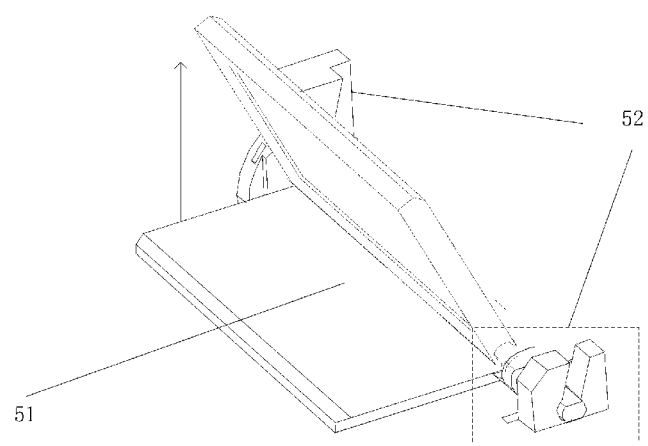
Figure 9C:
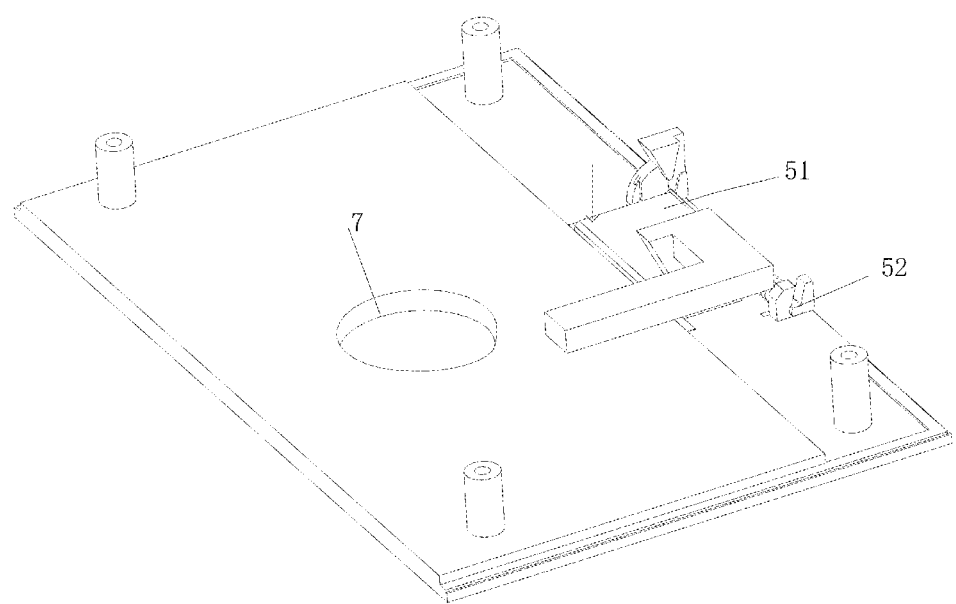

In some embodiments, the torsion spring actuates a rotation of the rotating shaft, such that a free end of the light reflection structure 51 performs a back and forth rotation simultaneously. For example, without application of external force, the torsion spring will actuate the rotating shaft, and in turn actuate the free end of the light reflection structure 51 to perform rotation in a down to up movement as shown in FIG. 9b, but in some embodiments, one end of the driving element 62 in connection with the turning structure 52 applies an external downward force to the turning structure 52, such that the light reflection mechanism 51 is moved into close proximity with the electronic device, as shown in FIG. 9c.

Figure 9D:
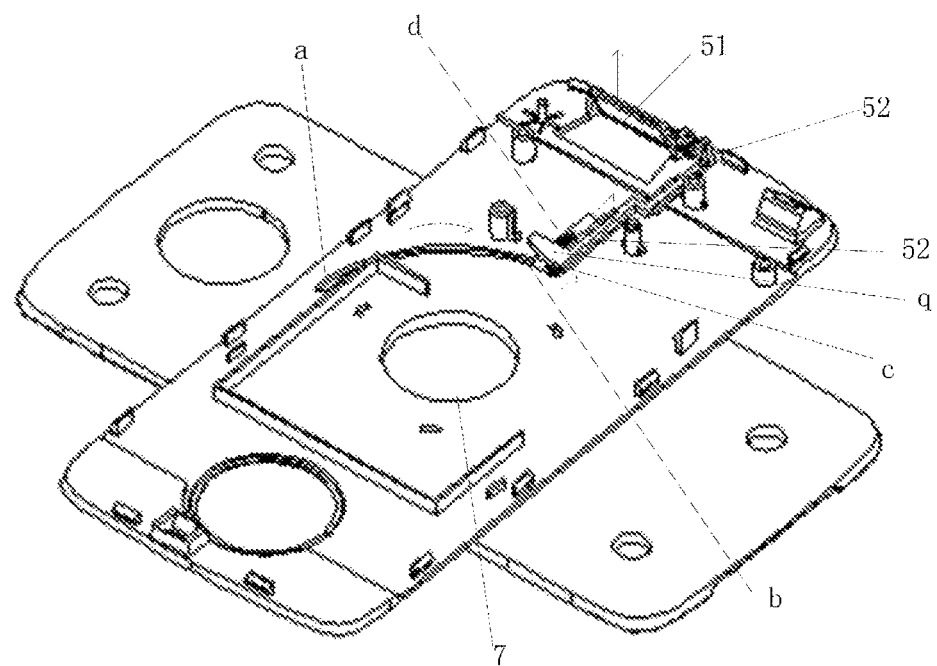

In some embodiments, the connecting element 61 is a raised structure "c". When the projection component and the electronic device are rotated and slid relative to one another, the raised structure "c" slides between "a" and "b" within a rail. When the projection component and the electronic device are rotated to locations, as shown in FIG. 9d, the raised structure "c" slides to one sickle-shaped end "y" of the driving element 62, and applies an acting force from left to right, as shown in FIG. 9d, to the driving element 62, such that the driving element 62 can remove the downward pressure applied to the turning structure 52 and the light reflection structure 51, so that the light reflection structure 51 is bounced under a torsion spring effect of the turning structure 52, and rotated to a corresponding angle upwards for the output direction of the output light ray to be changed.

Figure 9E:
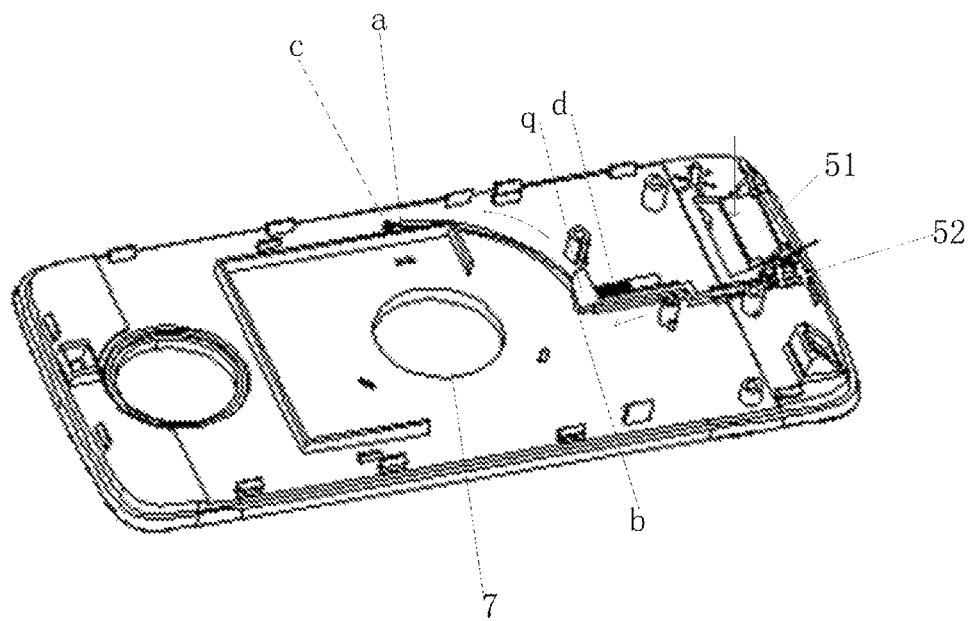

In some embodiments, when the raised structure "c" leaves end "b" of the rail thereof as the projection component 1 and the electronic device rotate without applying force to the driving element 62, the driving element 62 will move in a direction from right to left as shown in FIG. 9e due to a resilience of the spring "d", such that the driving element 62 can move in a direction from right to left as shown in FIG. 9e, and in turn, suppresses the light reflection structure 51 and the turning structure 52 again, so that the light reflection structure 51 and the turning structure 52 rotate counterclockwise back to an original location. Accordingly, the output direction of the output light ray is changed again to realize switching between the projection modes.

For example, in some embodiments, the electronic device is a cell phone, the projection component 1 is disposed on the back surface of the cell phone, (i.e., a surface opposite to the surface where a screen is located,) a rail portion of the slideway 7 is in a fastened connection with the cell phone, and a slider portion of the slideway 7 is in a fastened connection with the projection component 1. When the cell phone is rotated relative to the projection component 1, the connecting element 61 slides within the rail. In some embodiments, an angular deflection for rotation between the cell phone and the projection component 1 is translated to a back and forth motion of a connection rod (e.g., the driving element in the example) and guided onto a turning mechanism of a mirror (light reflection structure) by utilizing an effect of a connecting element (e.g., the raised structure in FIG. 9d) on the spring to realize an association between the two motions.

Alternatively, the electronic device is a cell phone with a rotary screen or a rotary cover. The projection component 1 is disposed on the rotary screen of the cell phone. When the cell phone performs rotation, in some embodiments, an angular deflection for rotation between the rotary screen and a body portion of the cell phone is translated to a back and forth motion of a connection rod (e.g., the driving element in the example) and guided onto a turning mechanism of a mirror (light reflection structure) by utilizing compression of the spring due to a connecting element (e.g., the raised structure in FIG. 9d) to realize an association between the two motions.

Figure 10A:
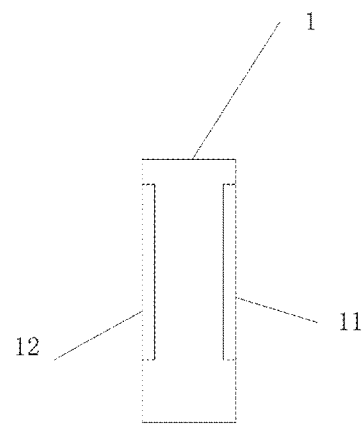
Figure 10B:
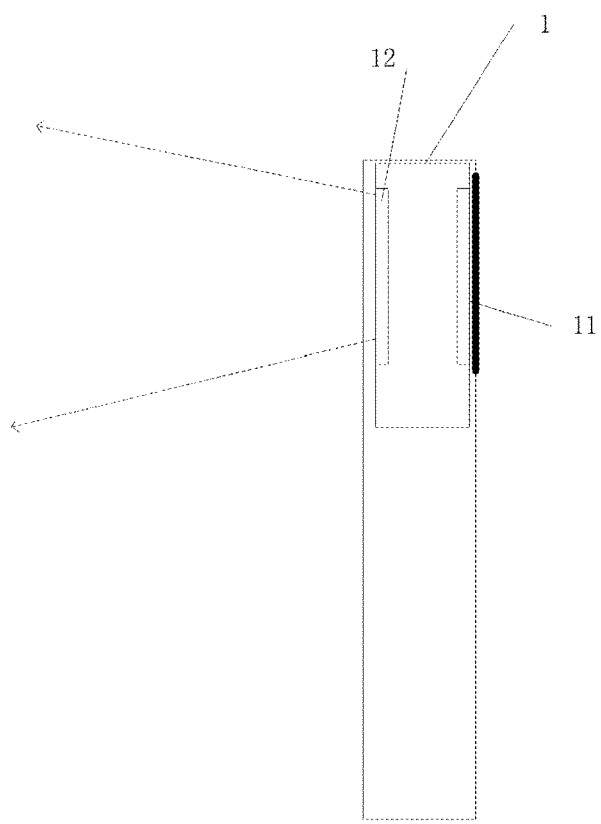
Figure 10C:
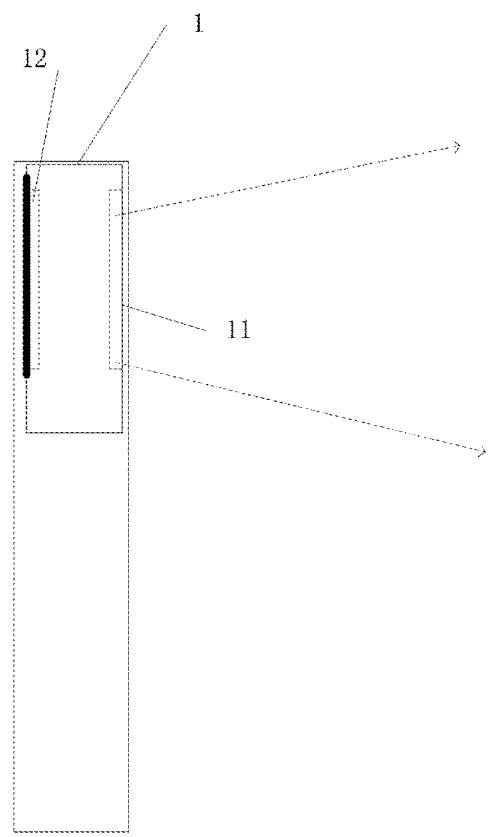

In some embodiments, the projection component 1 may have two projection openings: a first projection opening 11 and a second projection opening 12, as shown in FIG. 10a. In some embodiments, in the first projection mode, the first projection opening 11 is shielded by the electronic device or shielded by other object, while the output light ray output by the direction change mechanism 5 is output from the second projection opening 12, as shown in FIG. 10b. In the second projection mode, the first projection opening 11 is exposed, and the output light ray output by the direction change mechanism 5 may be output from the first projection opening 11, while the second projection opening 12 may be in an exposure state, or may be shielded by the electronic device or other object, as shown in FIG. 10c.

Figure 11:
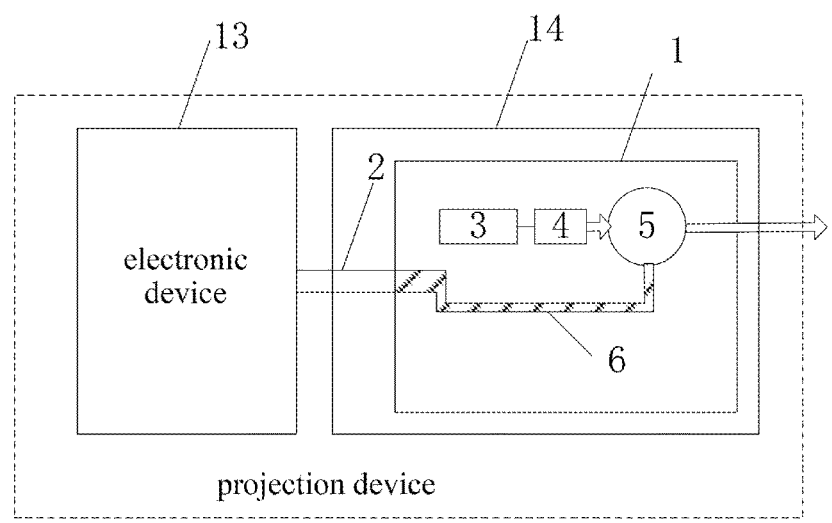
FIG. 11 is a schematic structural diagram of a projection system provided in another embodiment of the present invention.

Referring to FIG. 11, a schematic structural view for a projection system is provided in another illustrated embodiment according to the present invention. In some embodiments, the projection system includes: an electronic device 13 and a projection device 14. The projection device 14 and the electronic device 13 are independent of each other. The electronic device 13 may be a device such as a computer, cell phone, tablet, and the like, while the projection device may include a projection component 1 and a connection structure 2. In this manner, the projection component 1 is connected to the electronic device 13 through the connection structure 2, and the electronic device 13 sends a target projection content to the projection component 1 through a communication module thereof for the projection component 1 to output the target projection content.

In some embodiments, a structural state of the connection structure 2 can characterize a relative location state between the projection component 1 and the electronic device 13. That is, the structural state of the connection structure 2 can indicate a structure with which the projection component 1 and the electronic device 13 are connected to characterize the relative location state between the projection component 1 and the electronic device 13.

Figure 12:
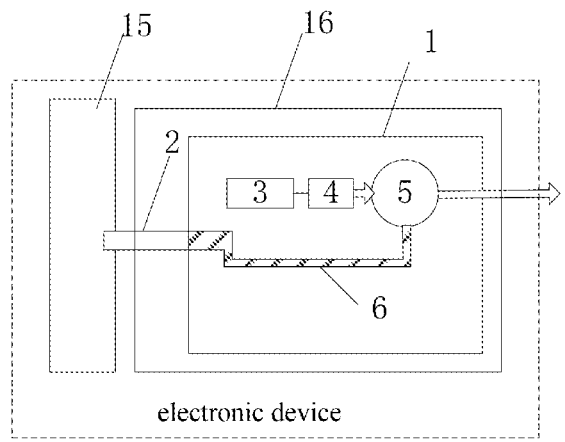
FIG. 12 is a schematic structural view of an electronic device provided in another embodiment of the present invention.

Referring to FIG. 12, the illustrated embodiment provides a schematic structural view of an electronic device, which includes a device body 15 and a projection body 16, which includes a projection component 1 and a connection structure 2. The projection component 1 is connected to the device body 15 through the connection structure 2. The electronic device can generate and output a target projection content from the projection component 1 in the projection body 16 therein. That is, the electronic device in the embodiment is a device capable of a projection function. The projection component is a component which is integrated into the electronic device.

In some embodiments, a structural state of the connection structure 2 can characterize a relative location state between the projection component 1 and the device body 15. That is, the structural state of the connection structure 2 can indicate a structure with which the projection component 1 and the device body 15 are connected to characterize the relative location state between the projection component 1 and the device body 15.

In some embodiments, the projection component 1 includes a transmission module 3 for receiving the target projection content generated by the electronic device.

In some embodiments, the transmission module 3 includes a wired communication module or a wireless communication module, such as WiFi, Bluetooth, or GPS communication module and the like, the projection component 1 may receive the target projection content generated by the electronic device through the transmission module 3, the electronic device may be a device such as a cell phone, tablet, notebook and the like, and the target projection content may be image, text, or video content.

In some embodiments, the projection components 1 includes an output interface 4 for outputting an initial light ray corresponding to the target projection content.

In some embodiments, the initial light ray output by the output interface 4 is a light ray obtained by performing a digital to analog conversion on the target projection content.

The illustrated embodiment also includes a direction change mechanism 5 for performing an optical path control for the initial light ray to get an output light ray, which corresponds to a first projection mode or a second projection mode, an output direction of the output light ray differing between the first projection mode and the second projection mode.

That is, the projection component 1 utilizes the direction change mechanism 5 thereof to be capable of two projection modes: the first projection mode and the second projection mode, in both of which the output direction of the output light ray output by the projection component differ.

The illustrated embodiment also includes a linkage apparatus 6 in connection with the connection structure 2 and the direction change mechanism 5, such that the linkage apparatus 6 drives the direction change mechanism 5 to change the output direction of the output light ray thereof for the projection mode of the projection component 1 to be switched between the first projection mode and the second projection mode when the relative location state between the projection component 1 and the device body 15 varies.

In some embodiments, the linkage apparatus 6 and the connection structure 2 are connected, so that the linkage apparatus 6 can monitor variation of the relative location state between the projection component 1 and the device body 15 in real time when the structural state of the connection structure varies, and accordingly, drive the direction change mechanism 5 to change the output direction of the output light ray thereof in real time, such that switching between the first projection mode and the second projection mode is realized.

That is, in the illustrated embodiment, the projection component 1 has one linkage apparatus 6 disposed therein, which is connected to the connection structure 2, such that when the variation of the relative location state between the projection component 1 and the device body 15 is monitored, the direction change mechanism 5 is driven to change the output direction of the output light ray thereof, and in turn, a mode switching between the first projection mode and the second projection mode is realized without manual mode switching or instruction based mode switching performed for the projection device particularly by a user, for whom convenience is provided.

In some embodiments, an output direction "a" of the output light ray in the first projection mode is different from an output direction "b" of an input light ray in the second projection mode, as shown in FIG. 2a. Correspondingly, a projection plane "x" to which the output light ray points in the first projection mode is different from a projection plane "y" to which the output light ray points in the second projection mode, as shown in FIG. 2b.

From the solution mentioned above, some embodiments according to the present invention, provide an electronic device, in which a linkage apparatus is disposed in the projection component of the projection body, such that the direction change mechanism in a projection component may be driven to change an output direction of the output light ray thereof when a relative location state between the projection component and a device body connected therewith varies, so that switching between projection modes is realized. In some embodiments of such a switching solution, the user may realize mode switching without performing an adjustment operation for the projection device separately, so that a user operation process is simplified and an operation complexity is reduced.

It is to be noted that the embodiments above may be referenced for implementation solutions and examples of various parts in the projection body 16 without further elaboration herein.

Figure 13:
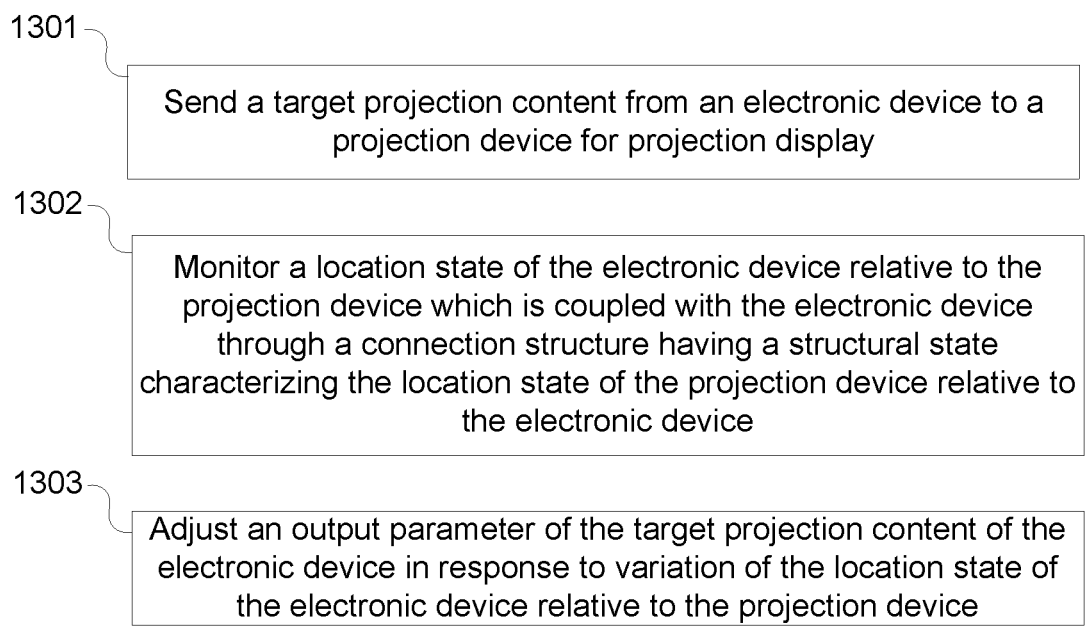
FIG. 13 is an implementation flow diagram of a projection control method provided in another embodiment of the present invention.

Refer to FIG. 13, which is an implementation flow diagram of a method according to embodiments described in the present disclosure. In some embodiments, the method is applicable to be used in an electronic device At block 1301, the method includes sending a target projection content from an electronic device to a projection device for projection display. In some embodiments, the target projection content is sent through a wireless or wired connection between the projection device and the projection display. In some embodiments, the target projection content is translated from one format of the electronic device to another format of the projection device.

At block 1302, a relative location state between the electronic device and the projection device is monitored. The projection device is coupled with the electronic device through a connection structure. A structural state of the connection structure characterizes the location state of the projection device relative to the electronic device. In some embodiments, the projection device is coupled directly or indirectly with the electronic device through the connection structure. Embodiments of the connection structure are described above with reference to the preceding figures.

In some embodiments, the location state of the projection device relative to the electronic device is determined by the connection structure and other structures coupled to the connection structure to communicate the location state of the electronic device to the projection device.

At block 1303, the method includes adjusting an output parameter of the target projection content of the electronic device in response to variation of the location state of the electronic device relative to the projection device.

In some embodiments, the variation in the location state of the electronic device relative to the projection device is determined through mechanical interaction of one or more parts within the projection device.

It is to be noted that, related embodiments above may be referenced for a structure of the projection device and a connection structure between the projection device and the electronic device without further elaboration.

In some embodiments, when the relative location state between the electronic device and the projection device varies, a projection mode of the projection device varies in correspondence. In some embodiments, the variation causes the projection device to transition from a first projection mode to a second projection mode or from the second projection mode to the first projection mode. In some embodiments, the output parameters of the target projection content sent by the electronic device for the projection device are adjusted in correspondence. In some embodiments, the output parameters of the target projection content sent by the electronic device to the projection device are matched with a current projection mode of the projection device.

In some embodiments, the output parameters include: multi-page display or single-page display parameters, vertical screen or horizontal screen display parameters, content quantity parameters, brightness parameters and the like.

For example, in some embodiments, the multi-page display parameters of the target projection content are adjusted when the output parameters of the target projection content are adjusted, such that a multi-page display is changed to a single-page display after the projection mode of the projection device is determined to have varied.

In another embodiment, the content quantity in the target projection content is adjusted. For example, the projection mode of the projection device may be adjusted, e.g., a desktop projection is changed to a wall projection, to increase a projection area, so that the number of texts or images in the target projection content is increased.

In other embodiments, the brightness parameters in the target projection content is adjusted. For example, the projection mode of the projection device can be adjusted, e.g., the desktop projection is changed to the wall projection, so that, the output brightness parameters of the target projection content are adjusted in correspondence in the embodiment in order for a clear display content; and so on.

For brevity, various method embodiments above are expressed in a combination of a series of actions. However, persons of skill in the art should know that the present application is not limited to the order of the described actions because some blocks or portions of the methods may be performed in another order or simultaneously in accordance with the present application. Persons of skill in the art should also know that the embodiments described in the Description are all preferred embodiments, and the involved actions and modules may not be necessary for the present application.

Various embodiments in the specification are described in a progressive manner. The same or similar parts between the embodiments may be referenced to each other. In each embodiment, the portion that is different from other embodiments is concentrated and described. For the devices disclosed in the embodiments, the descriptions are relatively brief as they correspond to the methods disclosed in the embodiments. Please refer to the description of the methods for relevant points.

It is to be noted that relational terms, such as first and second, herein are simply used to differentiate one entity or operation from another entity or operation, and may not necessarily require or imply any of such actual relations or sequences between these entities or operations. Moreover, the terms "comprise", "include" or any other variation thereof are intended to cover a non-exclusive inclusion, such that a process, a method, an article, or a device that comprises a list of elements does not comprise only those elements but may comprise other elements not expressly listed or inherent to such process, method, article, or device. An element defined by the phrase "comprises a . . . " does not, without more constraints, preclude the existence of additional identical elements in the process, method, article, or device that comprises the element.

For better description, the above device is described with various units divided by functions. Of course, for implementing the present application, the functions of various units can be realized in one or more pieces of software and/or hardware.

Those skilled in the art can understand clearly from the description of the above embodiments that the present application may be realized with the help of software and necessary general hardware platform. Based on this understanding, the technical solutions of the present application in essence or part of which making contribution to the prior art can be embodied in the form of a software product which can be stored in the storage medium such as ROM/RAM, diskette or optical disc, and the like, comprising several instructions for one computer equipment (which can be a personal computer, a server or a network equipment and the like) to execute the embodiments of the present application or execute the method described by some parts of the embodiments.

The foregoing description of the disclosed embodiments enables a person skilled in the art to implement or use the present invention. Various modifications to the embodiments are obvious to the person skilled in the art, and general principles defined in this description may be implemented in other embodiments without departing from the spirit or scope of the present invention. Therefore, the present invention will not be limited to the embodiments described in this description, but rather extends to the widest scope that complies with the principles and novelty disclosed in this description.

What is claimed is:

1. A device comprising:
    a connection structure that connects to an electronic device, the connection structure comprising a rotary connection structure comprising a cam structure; and
    a projection component that connects to the electronic device through the connection structure to project a target projection content received from the electronic device, wherein the projection component and the electronic device rotate relative to one another through the cam structure and rotation of the projection component relative to the electronic device results in a variation in a relative arrangement between the projection component and the electronic device, wherein the projection component comprises:
        a transmission module that receives the target projection content from the electronic device;
        an output interface that outputs an initial light ray corresponding to the target projection content;
        a direction change mechanism that directs the initial light ray to form an output light ray in one of a plurality of output directions; and
        a linkage apparatus coupled to the connection structure and the direction change mechanism, wherein the linkage apparatus drives the direction change mechanism to change the output direction of the output light ray from a first output direction to a second output direction in response to the variation in the relative arrangement between the projection component and the electronic device.

2. The device according to claim 1, wherein the projection component has a plurality of projection openings from which the target projection content is projected.

3. A device comprising:
    a connection structure that connects to an electronic device; and
    a projection component that connects to the electronic device through the connection structure to project a target projection content received from the electronic device, wherein the projection component comprises:
        a transmission module that receives the target projection content from the electronic device;
        an output interface that outputs an initial light ray corresponding to the target projection content;
        a direction change mechanism that directs the initial light ray to form an output light ray in one of a plurality of output directions, wherein the direction change mechanism comprises:
            a light reflection structure for reflecting the initial light ray output by the output interface; and
            a turning structure coupled to the light reflection structure, the turning structure capable of actuating rotation of the light reflection structure to adjust an angle between the light reflection structure and the direction of the initial light ray; and
        a linkage apparatus coupled to the connection structure and the direction change mechanism, wherein the linkage apparatus drives the direction change mechanism to change the output direction of the output light ray from a first output direction to a second output direction in response to a variation in a relative arrangement between the projection component and the electronic device.

4. The device according to claim 3, wherein the linkage apparatus comprises:
    a connecting element connecting to the connection structure; and
    a driving element connecting to the connecting element and the direction change mechanism to drive the direction change mechanism to change the output direction of the output light ray.

5. The device according to claim 4, wherein the turning structure actuates rotation of the light reflection structure.

6. The device according to claim 5, wherein the connecting element comprises:
    a spring connecting to the connection structure, wherein a change in an extension of the spring causes the driving element to perform a back and forth motion to drive the turning structure to perform a turning motion such that the turning structure causes the light reflection structure to rotate.

7. The device according to claim 5, wherein the connecting element comprises:
    a connecting rod mechanism coupled to the connection structure, wherein a change of a linkage state of the connecting rod mechanism causes the driving element to perform a back and forth motion to drive the turning structure to perform a turning motion such that the turning structure causes the light reflection structure to rotate.

8. A system comprising:
    an electronic device having a target projection content; and
    a projection device comprising:
        a projection component that receives the target projection content from the electronic device; and
        a connection structure that connect the projection component to the electronic device;
        the projection component comprising:
            a transmission module that receives the target projection content from the electronic device;
            an output interface that outputs an initial light ray corresponding to the target projection content;
            a direction change mechanism that directs the initial light ray to form an output light ray in one of a plurality of output directions, the direction change mechanism comprising:
                a light reflection structure for reflecting the initial light ray output by the output interface; and
                a turning structure coupled to the light reflection structure, the turning structure capable of actuating rotation of the light reflection structure to adjust an angle between the light reflection structure and the direction of the initial light ray; and
            a linkage apparatus coupled to the connection structure and the direction change mechanism, wherein the linkage apparatus drives the direction change mechanism to change the output direction of the output light ray in response to a variation in an arrangement of the projection component relative to the electronic device.

9. A system comprising:

an electronic device having a target projection content; and a projection device comprising:

a projection component that receives the target projection content from the electronic device; and a connection structure that connect the projection component to the electronic device, wherein the connection structure comprises a rotary connection structure comprising a cam structure through which the projection component and the electronic device rotate relative to one another, wherein the rotation of the projection component relative to the electronic device results in a variation in an arrangement of the projection component relative to the electronic device the projection component comprising:

a transmission module that receives the target projection content from the electronic device;

an output interface that outputs an initial light ray corresponding to the target projection content;

a direction change mechanism that directs the initial light ray to form an output light ray in one of a plurality of output directions; and a linkage apparatus coupled to the connection structure and the direction change mechanism, wherein the linkage apparatus drives the direction change mechanism to change the output direction of the output light ray in response to the variation in the arrangement of the projection component relative to the electronic device.

10. A method, comprising:

sending a target projection content from an electronic device to a projection device for projection display;

obtaining the target projection content from the electronic device;

outputting an initial light ray corresponding to the target projection content;

directing the initial light ray to form an output light ray in one of a plurality of output directions;

detecting a variation in an arrangement of the electronic device relative to the projection device; and adjusting an output direction of the output light ray of the target projection content from a first output direction to a second output direction in response to the variation of the arrangement of the electronic device relative to the projection device.

11. The method according to claim 10, further comprising:

manipulating a projection component of the projection device relative to the electronic device to facilitate the variation in the arrangement of the electronic device relative to the projection device.

\* \* \* \* \*